United States Patent [19]

Anderson et al.

[11] 3,829,549

[45] Aug. 13, 1974

[54] PROCESS FOR TREATING WASTE PHOTOGRAPHIC PROCESSING SOLUTION AND RECOVERING RESIDUAL SILVER THEREFROM AS A SILVER HALIDE

[75] Inventors: Ralph Anderson, Saratoga; Rodney B. Beyer, both of Sunnyvale, Calif.

[73] Assignee: Future Systems, Inc., Los Gatos, Calif.

[22] Filed: Oct. 30, 1972

[21] Appl. No.: 302,008

[52] U.S. Cl............... 423/43, 423/42, 423/45, 423/46, 423/491
[51] Int. Cl.............................................. C01g 5/00
[58] Field of Search ........... 423/42, 43, 45, 46, 491, 423/475

[56] References Cited
UNITED STATES PATENTS
3,056,656   10/1962   Nicolaisen ...................... 423/475 X
3,594,157   7/1971   Hendrickson et al................ 423/43

OTHER PUBLICATIONS
C. A. Jacobson's book "Encyclopedia of Chemical Reactions," Vol. 6, 1956 Ed., page 278. Reinhold Pub. Corp., New York.

H. Remy's "Treatise on Inorganic Chemistry," Vol. 2, 1956 Ed., page 397. Elsevier Pub. Co., New York.

*Primary Examiner*—Edward Stern
*Attorney, Agent, or Firm*—Schatzel & Hamrick

[57] ABSTRACT

A formulation and method for treating waste photographic processing solutions to destroy the pollutant nature of the solution and recover residual silver from the solution. Waste photographic processing solutions containing silver thiosulfate complexes and/or sulfite, such as exhausted fixing solutions, are treated with a chemical formulation including an oxidant of sodium chlorate in the presence of an acidic buffering agent. The formulation oxidizes the thiosulfate and/or sulfite ions of the solution to the sulfate state and precipitates the silver ion as an insoluble halide.

9 Claims, No Drawings

PROCESS FOR TREATING WASTE PHOTOGRAPHIC PROCESSING SOLUTION AND RECOVERING RESIDUAL SILVER THEREFROM AS A SILVER HALIDE

BACKGROUND OF THE INVENTION

This invention relates in general to the photographic processing art and more specifically to the treatment of waste photographic processing solutions to destroy the pollutant nature of the solution and to precipitate the silver out of the solution.

In processing photographic film, the film is treated with a processing solution and silver is extracted from the gelatin layer of the film to the solution as a soluble silver complex. The processing solution, frequently referred to as "hypo" or "fixer," commonly includes an ammonium or alkali metal thiosulfate. During the process, the thiosulfate complex of the fixer reacts with the silver from the gelatin layer of the film in such a way that the silver becomes part of a negatively charged silver thiosulfate complex. The solution may then be termed as a "waste photographic processing solution" or "waste fixer."

After the photographic processing of film is completed, the waste fixer solution need be disposed. The waste fixer solution is a high oxygen demanding solution and if dumped directly in environmental water sources contributes to water pollution. The waste fixer solution may contain thiosulfate and/or sulfite ions which are high oxygen demanding pollutants when released in the environment. The waste fixer, when released in the environment and water streams is lethal to plant, bacteria, marine and animal life. Thus it is desirable to neutralize or destroy the pollutant nature of the thiosulfate and/or sulfite ions prior to releasing them in the environment and water streams. The silver ion within the waste fixer is a pollutant and a valuable metal. Thus, it is desirable to recover the silver both for environmental purposes and economic purposes.

Various commercial methods are available for recovery of silver from photographic processing solutions. For example, there are three primary classes of sliver recovery systems. These three classes include electrolytic recovery systems, metallic replacement systems, and chemical systems in which silver is precipitated from solution by addition of chemical agents. Electrolytic silver recovery systems provide for plating out of the dissolved silver on the cathode of an electrolytic cell. Metallic replacement systems provides for the fixer solution to be brought into contact with a metal which metal replaces the dissolved silver. In chemical systems, precipitation of the silver is generated by addition of chemical agents to the fixer solution such that the silver metal ion precipitates as a halide and drops out of solution.

Accordingly, it becomes desirable to destroy the pollutant nature of the waste fixer before the waste fixer is released to the environment and after the silver is extracted. U.S. Pat. No. 3,594,157 discloses a method for alkaline chlorination of waste photographic processing solutions to reduce the solutions oxygen demand. This method calls for the mixing of chlorine gas or sodium hypochlorite with the fixer solution to provide a highly alkaline mixture. However, the use of such formulation generates obnoxious odors and must be handled with considerable care. Gaseous chlorine is also awkward and dangerous to handle and store.

The treatment of waste fixer solution is of concern to photographic film processors of various sizes. Photographic processing has become widely used and continuously increases. The size of facilities of the various users range from the large photographic processing laboratories to the small users such as individual hobbyists, dental and medical offices. Notwithstanding their size and volume of use, photographic processors of all sizes have photographic waste material to dispose. Every user of photographic materials and processes who disposes waste fixer is a potential contributor to the pollution problems. For example, a gallon of waste fixer may contain up to 250,000 parts per million (PPM) of thiosulfate and 10,000 PPM of silver. Present water quality standards require maximum concentrations of 0.5 and 0.05 PPM respectively of these two species.

Accordingly, it is desirable to have a formulation and method for destroying the pollutant nature of the waste fixer which can be easily used by the small volume user as well as the large volume user. The formulation and process preferably need be of a nature which is economical, does not generate obnoxious odors, is non-corrosive and which can be performed by relatively simple procedures. It is further desirable that the reaction and destruction of the thiosulfate complex and sulfite ions be of a nature which will be completed in a reasonable period of time. The reaction should preferably occur with minimal free sulfur; with recovery of the silver as a fixer soluble precipitate; and at a pH consistent with reaction completion. The reaction formulation ingredients should preferrably be small in bulk and non-toxic.

SUMMARY OF THE PRESENT INVENTION

The present invention provides for a formulation and process for treating waste photographic fixer solution which oxidizes the thiosulfate complex and sulfite ions to nonpollutant species and provides for the silver held in the fixer to precipitate out as an insoluble silver salt. The formulation includes a chlorate oxidant in the presence of a buffer which when introduced to the waste fixer oxidizes the thiosulfate complex and sulfite ion to a sulfate ion and precipitates the silver as a silver halide.

The present formulation and process is adapted to accommodate the small user of photographic processing solutions (e.g. less than 1 gallon of fixer per day) as well as the moderate and large user (e.g., greater than 1 gallon of fixer per day). The small user may find it uneconomical to maintain a silver recovery operation in house as part of the pollution abatement process. Accordingly, the chemicals of the present invention may be used by the small user to abate the pollution of the fixer such that liquid fixer may be separated from the silver halide precipitate. After separation, the liquid may be dumped in a drain disposal. The silver halide may be collected and stored.

After a sufficient supply of the silver halide precipitate is collected, the supply may be shipped to a silver recovery facility for separation of the silver from the halide and recovery of the silver metal. Silver recovery from the supply may be realized simply by introducing the silver halide precipitate in a volume of waste solution at the facility. The solution is then processed through a silver recovery system to recover the silver. The large user of photographic processing solutions may include in its pollution abatement system, a silver recovery unit. Accordingly, to recover the silver metal after separation of the silver halide precipitate from the waste fixer, the silver ion precipitate is introduced into the silver recovery system along with other fixer being processed.

The present formulation is adapted to provide a formulation which is economical for use so as to provide an economic incentive to the small and large user to reclaim silver. It further provides for a relatively clear and odorless resulting solution with the solids precipitated out. It further provides for a formulation which avoids the use of toxic and non-biodegradable chemical species.

DESCRIPTION OF THE PREFERRED EMBODIMENT

The fixing agent ("hypo," "fixer") utilized in film processing, has a thiosulfate ion $(S_2O_3)^=$. For example, the fixer may take the form of sodium thiosulfate $(Na_2S_2O_3)$ or ammonium thiosulfate $[(NH_4)_2 S_2O_3]$.

A supply of chlorate ion, e.g., sodium chlorate is introduced into the fixer solution. This may be done at room temperature. The thiosulfate ion is a highly pollutant ion which can be neutralized by sodium chlorate $(NaClO_3)$ at room temperature over a range of pH on the acid side of approximately 0.5 to 3.0. With a stoichiometric ratio of $NaClO_3$ to thiosulfate, the chlorate-thiosulfate reaction may be illustrated by the following reduction-oxidation equation.

$$S_2O_3^= + 5H_2O \rightarrow 2SO_4^= + 10H^+ + 8e^- \qquad (1)$$

$$ClO_3^- + 6H^+ + 6e^- \rightarrow Cl^- + 3H_2O \qquad (2)$$

Adding equations (1) and (2) and balancing electrons:

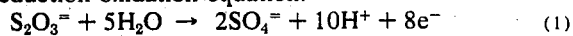
$$S_2O_3^= + 4/3 ClO_3^+ + {}_{H2}O \xrightarrow{H^+} 2SO_4^= + 4/3 Cl^- + 2H^+ \qquad (3)$$

Thus, introduction of sodium chlorate over a range of pH of approximately 0.5 to 3.0 results in a neutralization of the thiosulfate ion $(S_2O_3)^=$ to a sulfate ion $(SO_4)^=$.

The electromotive force $E°$ for the reaction of equation (1) is −0.60 and for equation (2) is +1.45 such that the net electromotive force for equations (1) and (2) is +0.85 volts. Thus the reaction of the chlorate ion and thiosulfate complex is spontaneous with a driving potential of +0.85. Hydrogen ions are formed in the reaction thus making it an acidic reaction. Experimentally it was found that the reaction was very slow for reactions above a pH of 5.

For "hypo" processing solutions including sulfite ions $(SO_3^=)$, the introduction of chlorate ions neutralizes the sulfite ions to sulfate ions. The chlorate-sulfite reaction may be illustrated by the following reduction-oxidation equation:

$$ClO_3^= + 6H^+ + 6e^- \rightarrow Cl^- + 3H_2O \qquad (4)$$

$$2SO_3^= + 2H_2O \rightarrow 2SO_4^= + 4H^+ + 2e^- \qquad (5)$$

Adding equations (4) and (5) and balancing electrons,

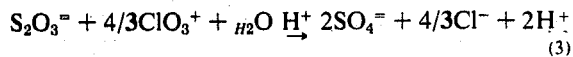
$$ClO_3^= + 2SO_3^= + 2H^+ \rightarrow Cl^- + 2SO_4^= + {}_{H2}O \qquad (6)$$

and, the sulfite ion is neutralized to sulfate ion. Thus, both the otherwise pollutant thiosulfate and sulfite ions are neutralized to non-pollutant sulfate ions.

In the waste fixer, the thiosulfate-silver ion complex is $(Ag^+(S_2O_3)_2^=)^-$. The basic reaction of the present formulation is the oxidation of the thiosulfate and sulfite ions to sulfate ions with the residual silver bound in the complex ion $[Ag^+ (S_2O_3)_2^=]^-$. The introduction of $NaClO_3$ to the waste solution destroys the $S_2O_3^=$ and hence the silver-thiosulfate complex. When the thiosulfite ion is oxidized to $SO_4^=$, the $Ag^+$ attaches to the $Cl^-$ (or halides) and precipitates out of the solution as $AgCl$.

The degree of precipitation of the silver salt is defined by the solubility product $(Ks)$ of silver chloride. The soluability product $Ks$ may be expressed mathematically as $$Ks = [Cl^-][Ag^+]/AgCl = 10^{-10}. \qquad (7)$$

Assuming the chloride ion $(Cl^-)$ concentration is 0.10 M and the silver chloride $(AgCl)$ concentration is 1, then the silver ion concentration becomes $$[Ag^+] = (10^{-10})(1)/0.1 = 10^{-10}/10^{-1} = 10^{-9}$$

or one part per billion (PPB). $\qquad (8)$

Thus, as to the main pollutants of thiosulfate, sulfite and silver in the waste fixer, the thiosulfate and sulfite ions are oxidized to sulfate (a non-pollutant) and the silver is substantially completely precipitated out as a halide. The precipitation further permits recovery of the silver from the precipitate. For example, to recover the silver, the $AgCl$ precipitate may be reintroduced to a supply of fixer solution. The supply of fixer may then be processed through an electrolytic silver recovery system to recover the silver electrolytically.

Recognizing that free sulfur has a tendency to form under acid conditions and chlorate does not readily react under alkaline conditions, tests were conducted to define the effects of sulfite on "hypo" stabilization in acid solutions. Tests included treating 1M hypo with a weakly buffered solution of sodium bisulfate ($NaHSO_4$) and sodium sulfate ($Na_2SO_4$). The buffering agent functions to aid in controlling the pH. The pH levels were adjusted from 1 to 4. The results, shown in the following Table 1, indicate that formation of free sulfur is inhibited when $SO_3^=$ is present and the pH is held less than 4.

Table 1

| Test No. | pH | $(SO_3)^=$ g/l | Sulfur Visibly Formed |
|---|---|---|---|
| 1 | 1 | 0 | Yes |
| 2 | 2 | 0 | Yes |
| 3 | 2 | 10 | No |
| 4 | 2.5 | 0 | Yes |
| 5 | 2.5 | 10 | No |
| 6 | 3 | 0 | Yes |
| 7 | 3 | 10 | No |
| 8 | 4 | 0 | Yes |

Further tests showed that free sulfur formed when hypo was treated with strong acids even in the presence of sulfite. The tests show that hypo with a low residual sulfite content will tend to form free sulfur during the reaction while hypo with high sulfite will resist formation of sulfur. To further inhibit formation of sulfur it is desirable to oxidize the hypo to sulfate before it has an opportunity to decompose spontaneously to sulfur in acid solutions.

The use of hypochloric acid (HCl) as a buffering acid on a 1:1 mole ratio of acid to fixer provides for increasing the rate of the reaction to its completion. It has further been found that maintaining the acid/thiosulfate ratio between approximately 6–7 and varying the ratio of chlorate to thiosulfate has no appreciable effect until the ratio of chlorate to thiosulfate is less than 2. The stoichiometry predicts 1.33 is the lowest ratio. Tests establishing such results are reported as follows:

Table II

Variation of Chlorate Ratio

| $[H^+]$ | $(S_2O_3)^=$ | $\dfrac{ClO_2^=}{(S_2O_3)^+}$ | % Completion of Destruction of Fixer | Time Hrs. |
|---|---|---|---|---|
| 0.46 | 0.07 | 6 | 99% | 24 |
| 0.37 | 0.06 | 9 | 99% | 24 |
| 0.60 | 0.10 | 6 | 99% | 24 |
| 0.46 | 0.07 | 12 | 99% | 24 |
| 0.60 | 0.10 | 9 | 98% | 24 |
| 0.46 | 0.07 | 18 | 99% | 24 |
| 0.73 | 0.12 | 3 | 99% | 24 |
| 0.73 | 0.12 | 2 | 98% | 24 |
| 0.73 | 0.12 | 1 | 75% | 24 |
| 0.73 | 0.12 | ½ | 25% | 24 |

It has been found that the thiosulfate can be substantially totally decomposed at reasonable rates as long as a stoichiometric amount of chlorate is available and the pH level is dropped to 2.25 or less. Tests further illustrated that at least a 1:1 ratio of acid to fixer is required to maintain the pH to a low level.

In viewing various acid producers as inorganic buffer agents, HCl, $H_2SO_4$, $NH_4HSO_4$ and $NaHSO_4$ have proven functionally acceptable. In viewing the relative costs, the most expensive to least expensive is as follows:

$H_2SO_4$, $NaHSO_4$, HCl and $NH_4HSO_4$.

After the reaction is completed and the silver chloride precipitate separated, a neutralizing chemical may be added to neutralize the end solution i.e., pH 7, before it is dumped or disposed. The neutralizing chemical may be calcium hydroxide.

Examples of formulation to neutralize one gallon of one molar fixer includes one pound of sodium chlorate and one pound of hydrochloric acid. The resultant destroyed solution is then mixed with one-half pound of calcium hydroxide.

A second example formulation to neutralize one gallon of one molar fixer includes one pound of sodium chlorate and one pound of sodium bisulfate. The resultant destroyed solution is then mixed with one-half pound of calcium hydroxide. Other samples to neutralize one gallon of one molar fixer includes one pound of sodium chlorate and one pound of ammonium bisulfate. The resultant destroyed solution of both of these samples may then be mixed with one pound or less of calcium hydroxide.

In carrying out the present method the oxidant can be provided in solid or liquid form in small quantities. Likewise, the buffering agent can be supplied in small quantities. This is advantageous to photographic processors having small quantities of waste fixer and who desire to preserve the silver as well as destroy the thiosulfate ion complex. After the fixer is utilized for the photographic processing, the oxidant and buffering agent is introduced to the waste fixer solution. The mixture is then permitted to stand for a period of time to permit the reaction to go to completion. After the silver chloride precipitates out it is separated from the solution. The neutralizing agent is then introduced and the resultant oxidized waste solution disposed of in the drain. The AgCl precipitate is then packaged and delivered to a silver recovery facility for recovery of the silver from the precipitate. For example, at the silver recovery facility, the precipitate may be introduced to a volume of fixer and then circulated through a silver recovery apparatus to separate the silver.

We claim:

1. A method for neutralizing a waste photographic processing solution containing thiosulfate and/or sulfite ions and silver to precipitate silver therefrom, said method comprising the steps of:
   mixing said processing solution with a chlorate oxidant in a mixture having a pH level in the acid range to oxidize the thiosulfate and/or sulfite ions to sulfate ions and to precipitate residual silver from said solution as a silver halide.

2. The method of claim 1 in which the amount of chlorate oxidant in said mixture provides at least a stoichiometric ratio of chlorate to thiosulfate complex and the pH level is within the range of approximately 0.5 – 3.0.

3. The method of claim 2 in which the pH level of the mixture is 2.25 or less.

4. The method of claim 1 wherein said oxidant is introduced in said processing solution in the presence of an acid buffering agent.

5. The method of claim 4 in which the molar ratio of said acid buffering agent to said solution is at least 1:1.

6. The method of claim 5 in which said buffering agent includes a solution of sodium sulfate and sodium bisulfate.

7. The method of claim 3 including the further step of introducing a neutralizing agent to said solution after said residual silver precipitates from the solution as a silver and prior to dumping said solution in the environment.

8. The method of claim 7 in which said neutralizing agent is calcium hydroxide.

9. The method of claim 1 in which
   said chlorate oxidant is sodium chlorate, the ratio of the amount of chlorate oxidant to thiosulfate complex is greater than 1.33 and in which said chlorate oxidant is introduced in the presence of an acid buffering agent, the molar ratio of said acid buffering agent to said solution is at least 1:1 and the pH level of the mixture is within the range of 0.5 to 2.25.

* * * * *